July 17, 1951

R. C. MOORE, SR 2,560,732

FERTIZILER DISTRIBUTOR WITH PLURAL OUTLETS
CLOSED BY A COMMON GATE EQUIPPED WITH AN
ADDITIONAL CLOSURE FOR EACH OUTLET

Filed May 5, 1949

Inventor

Richard C. Moore, Sr.

By Clarence A. O'Brien
and Harvey B. Jacobson
Attorneys

July 17, 1951
R. C. MOORE, SR
2,560,732
FERTIZILER DISTRIBUTOR WITH PLURAL OUTLETS
CLOSED BY A COMMON GATE EQUIPPED WITH AN
ADDITIONAL CLOSURE FOR EACH OUTLET
Filed May 5, 1949
2 Sheets-Sheet 2
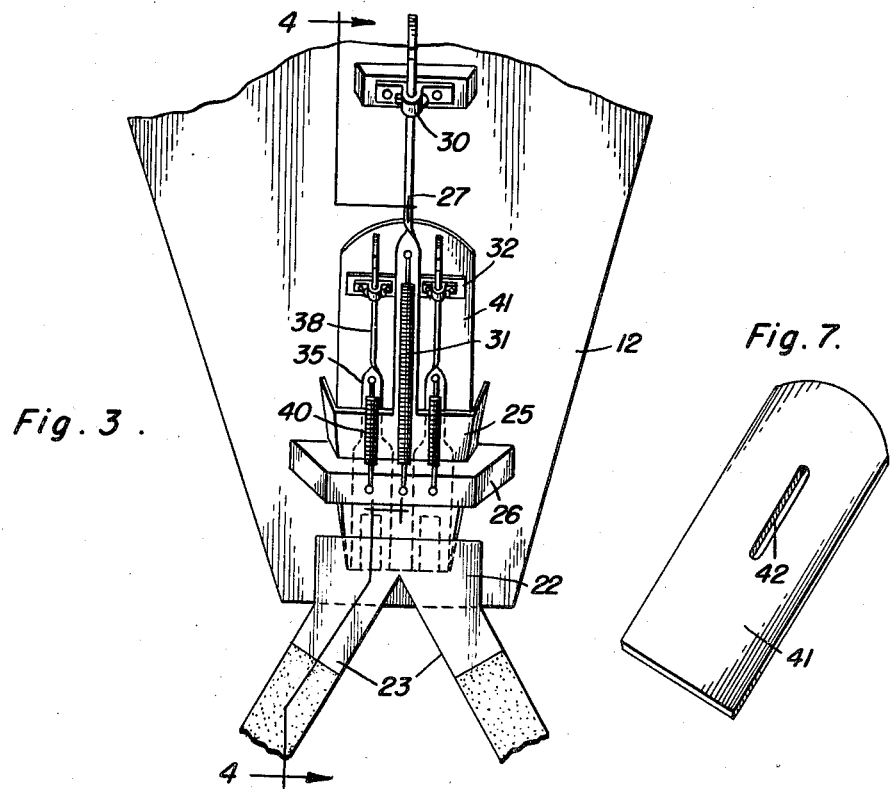
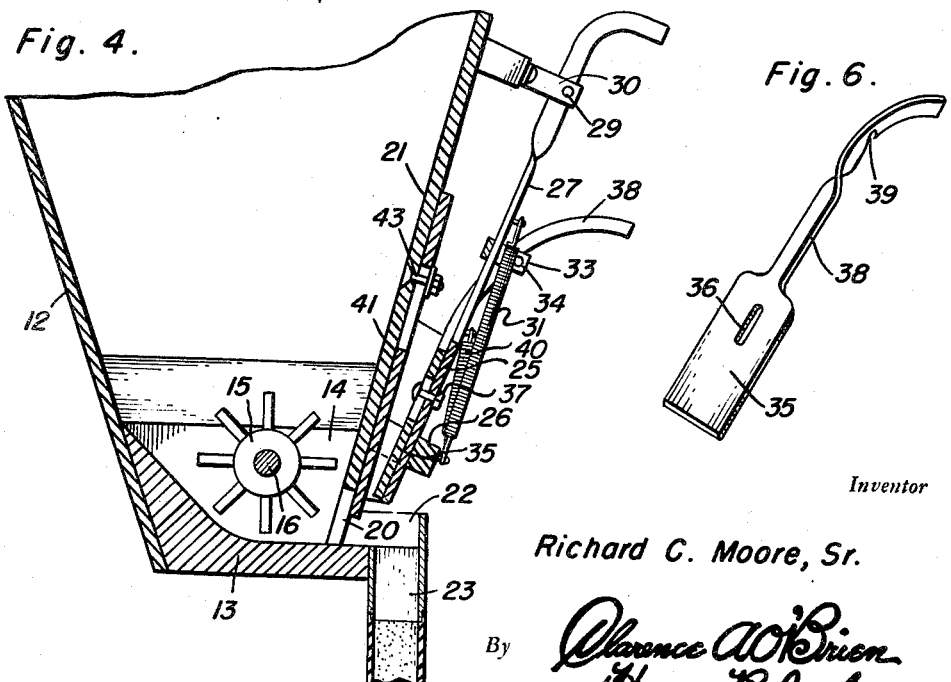
Inventor
Richard C. Moore, Sr.
By *Clarence A. O'Brien and Harvey B. Jacobson*
Attorneys Patented July 17, 1951

2,560,732

UNITED STATES PATENT OFFICE 2,560,732

FERTILIZER DISTRIBUTOR WITH PLURAL OUTLETS CLOSED BY A COMMON GATE EQUIPPED WITH AN ADDITIONAL CLOSURE FOR EACH OUTLET

Richard C. Moore, Sr., Bowden, N. C.

Application May 5, 1949, Serial No. 91,502

4 Claims. (Cl. 222—482)

The present invention relates to new and useful improvements in distributors for fertilizer and the like and more particularly to a horse or tractor-drawn distributor.

An important object of the invention is to provide a fertilizer distributor commonly known as a side dresser provided with a pair of discharge spouts for supplying fertilizer to a double row of plants.

Another object of the invention is to provide control means for the discharge of fertilizer from a hopper into the spout and whereby the supply may be cut off from either spout, or the supply simultaneously cut off from both spouts.

A still further object is to provide a two-wheel distributor and skids at the rear of the distributor and positioned behind each wheel to relieve an attendant walking behind the distributor of the weight thereof and also to prevent tipping over of the distributor.

A still further object is to provide a device of this character of simple and practical construction, which is efficient and reliable in operation, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 3 is an enlarged rear elevational view showing the control gate or cut-off plates for the discharge spouts;

Figure 4 is a vertical sectional view taken on a line 4—4 of Figure 3;

Figure 6 is a similar view of one of the individual cut-off gates; and

Figure 7 is a similar view of the adjustable volume regulating plate.

Figure 1:
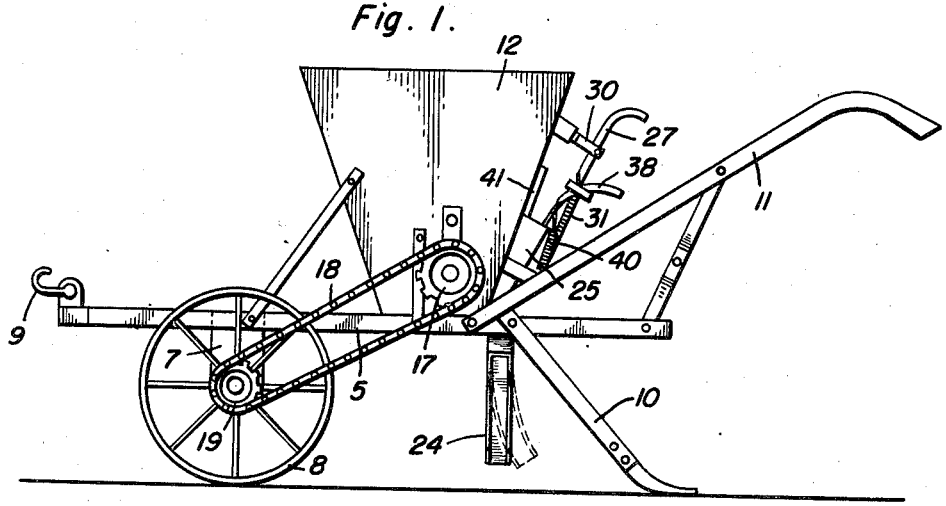
Figure 1 is a side elevational view.
Figure 2:
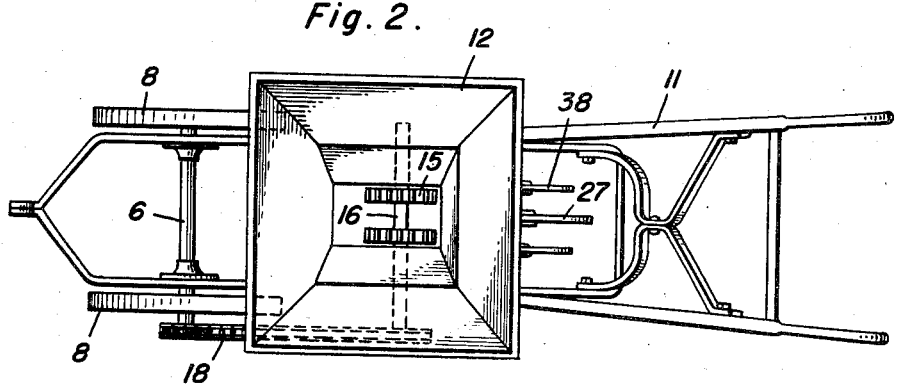
Figure 2 is a top plan view.
Figure 5:
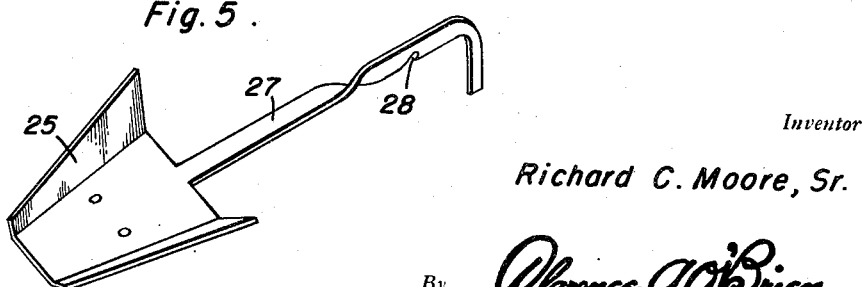
Figure 5 is a perspective view of the single control gate for both discharge spouts.

Referring now to the drawings in detail wherein, for the purpose of illustration, I have disclosed a preferred embodiment of the invention, the numeral 5 designates a frame having an axle 6 journaled in hangers 7 adjacent the front end of the frame with a pair of wheels 8 suitably secured at each end of the axle outwardly of the frame. The front end of the frame is provided with a hitch 9 by means of which the same may be drawn by a horse or tractor.

A pair of skids 10 are suitably secured at their upper ends to the rear portion of frame 5 and extend downwardly therefrom in a rearwardly inclined position to support the weight at the rear end of the frame and to prevent tipping over thereof. Handles 11 extend upwardly from the rear of the frame 5.

A hopper 12 is suitably secured on frame 5 rearwardly of wheels 8 and includes a bottom 13 having a pair of chambers 14 formed in its upper surface in which a pair of feed wheels and agitators 15 are rotatably positioned and operated by a shaft 16 projecting outwardly at one side of the hopper and to which a sprocket 17 is secured and driven by a chain 18 from a sprocket 19 secured to one end of axle 6.

Outlets 20 are provided for chambers 14 in the bottom of rear wall 21 of the hopper, the outlets leading to a head 22 at the upper ends of a pair of diverging spouts 23 inclined toward opposite sides of frame 5 and having flexible extensions 24 at their lower ends.

The top of head 22 is open and a substantially scoop or channel-shaped cut-off gate 25 is slidably positioned vertically in a substantially U-shaped guide 26 suitably secured at the lower portion of rear wall 21 of the hopper to hold the side edges of the cut-off gate against the rear surface of the hopper for movement into and out of head 22 to simultaneously cut off flow of fertilizer from outlet 22 into both spouts 23. A handle 27 extends upwardly from cut-off gate 25 and is provided with a notch 28 for engaging a transverse pin in a U-shaped upper guide 30 in which the handle is slidably positioned. The guide 30 is suitably secured to the rear wall 21 of the hopper. A coil spring 31 connects handle 27 of control gate 25 to lower guide 26 to lower the gate into its closed position in head 22.

A cross-bar 32 is suitably secured to handle 27 and to which a pair of U-shaped guides 33 are suitably secured and each provided with a transverse pin 34.

A pair of cut-off gates or plates 35 are positioned in cut-off gate 25 and are provided with vertical slots 36 sliding on pins or bolts 37 secured to cut-off gate 25 to provide individual cut-off gates for the outlets 20 leading to head 22 and spouts 23.

Each cut-off gate 35 is provided with an upwardly extending handle 38 having a notch 39 formed therein for engaging the pin 34 to hold the gate in a raised position, and a coil spring 40 connects each handle 38 with the U-shaped guide 26 to close its associated gate 35.

A regulating plate 41 is secured in slidably adjusted position to the outer surface of rear wall 21 by means of a vertical slot 42 in regulating plate 41 in which a bolt and nut 43 carried by the hopper is positioned, the lower end of plate 41 being adjusted vertically behind both outlets 20 to regulate the volume of material discharged through each outlet.

In the operation of the device, the motion of wheels 8 in travelling over the ground drives feed wheels and agitators 15 to discharge fertilizer or other material in hopper 12 through outlets 20, the volume of material discharged from the hopper being further controlled by the adjustment of plate 41.

The fertilizer is fed from the outlet 20 into head 22 and the discharge of the material from head 22 into spouts 23 may be individually controlled by the cut-off gate 35 to supply fertilizer to a row of plants at either side of the distributor, or both spouts may be simultaneously cut off by gate 25.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. A fertilizer distributor comprising a hopper having a plurality of outlets in one wall, a plurality of spouts leading from the outlets, a main cut-off gate positioned between the outlets and the spouts to simultaneously cut off all of the spouts, means slidably supporting the main cut-off gate on the hopper, and individual cut-off gates for each spout slidably carried by the main cut-off gate to selectively cut off the spouts independently of the main cut-off gate.

2. A fertilizer distributor comprising a hopper having a plurality of outlets in one wall, a plurality of spouts leading from the outlets, a main cut-off gate positioned between the outlets and the spouts to simultaneously cut off all of the spouts, means slidably supporting the main cut-off gate on the hopper, individual cut-off gates for each spout slidably carried by the main cut-off gate to selectively cut off the spouts independently of the main cut-off gate, a catch for each gate holding the same in an open position, and spring means connected to each gate holding the same in a closed position.

3. A fertilizer distributor comprising a hopper having a plurality of outlets in one wall, a plurality of spouts leading from the outlets, a main cut-off gate positioned between the outlets and the spouts to simultaneouesly cut off all of the spouts, means slidably supporting the main cut-off gate on the hopper, individual cut-off gates for each spout slidably carried by the main cut-off gate to selectively cut off the spouts independently of the main cut-off gate, said main cut-off gate being U-shaped in cross section and said second-named cut-off gates being enclosed in said main cut-off gate.

4. A fertilizer distributor comprising a hopper having a plurality of outlets, a plurality of spouts, a hollow head at the upper ends of the spouts connected to the outlets, a main cut-off gate slidably supported on the hopper and positioned in the head to simultaneously cut-off all the spouts, and individual cut-off gates for each spout slidably carried by the main cut-off gate to selectively cut off the spouts independently of the main gate.

RICHARD C. MOORE, Sr.

REFERENCES CITED

The following references are of record in the file of this patent:

UNITED STATES PATENTS

| Number | Name | Date |
| --- | --- | --- |
| Re. 1,560 | Fieled | Nov. 3, 1863 |
| 45,335 | Nauman | Dec. 6, 1864 |
| 111,421 | Barnes et al. | Jan. 31, 1871 |
| 307,610 | Whitman | Nov. 4, 1884 |
| 697,510 | Mattox | Apr. 15, 1902 |
| 878,443 | Young | Feb. 4, 1908 |
| 1,030,172 | Farley et al. | June 18, 1912 |
| 1,764,159 | Estevez | June 17, 1930 |
| 1,880,287 | Sifton | Oct. 4, 1932 |
| 2,069,350 | Blue, Jr. | Feb. 2, 1937 |